United States Patent
Tabata et al.

(10) Patent No.: US 11,262,529 B2
(45) Date of Patent: Mar. 1, 2022

(54) MIRROR HOLDING STRUCTURE, MIRROR STRUCTURE, IMAGE DISPLAY SYSTEM AND MOVABLE OBJECT

(71) Applicant: Panasonic Intellectual Property Management Co., Ltd., Osaka (JP)

(72) Inventors: Taichi Tabata, Kanagawa (JP); Yoshiaki Ueta, Shizuoka (JP); Masaki Amie, Shizuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/027,202

(22) Filed: Sep. 21, 2020

(65) Prior Publication Data
US 2021/0003815 A1    Jan. 7, 2021

Related U.S. Application Data (63) Continuation of application No. PCT/JP2019/013669, filed on Mar. 28, 2019.

(30) Foreign Application Priority Data

Mar. 28, 2018   (JP) .............................. JP2018-063266

(51) Int. Cl.
*G02B 7/182*   (2021.01)
*G02B 27/01*   (2006.01)
(Continued)

(52) U.S. Cl.
CPC .............. *G02B 7/182* (2013.01); *B60K 35/00* (2013.01); *G02B 5/10* (2013.01); *G02B 27/0101* (2013.01);
(Continued)

(58) Field of Classification Search
CPC .. G02B 7/182; G02B 27/0149; G02B 7/1824; G02B 7/1825; G02B 7/181; G02B 7/1827; B60K 35/00; B60K 2370/1529
See application file for complete search history.

(56) References Cited

U.S. PATENT DOCUMENTS 5,052,793 A * 10/1991 Lapp ...................... G02B 7/182
359/848

FOREIGN PATENT DOCUMENTS

| JP | 54-061644 | 4/1979 |
| JP | 58-042801 | 3/1983 |

(Continued)

OTHER PUBLICATIONS

Official Communication issued in International Patent Application No. PCT/JP2019/013669, dated Jul. 2, 2019, along with an English translation thereof.

*Primary Examiner* — Ryan D Howard
(74) *Attorney, Agent, or Firm* — Greenblum & Bernstein, P.L.C.

(57) ABSTRACT

A mirror holding structure includes: a holder; at least one protrusion part provided to one of a mirror body and the holder; at least one reception part provided to the other of the mirror body and the holder and having an insertion hole in which the at least one protrusion part is to be inserted; and at least one elastic part located between an outer peripheral surface of the at least one protrusion part and an inner peripheral surface of the insertion hole and being elastic.

20 Claims, 10 Drawing Sheets

(51) Int. Cl.
*B60K 35/00* (2006.01)
*G02B 5/10* (2006.01)

(52) U.S. Cl.
CPC .. *B60K 2370/1529* (2019.05); *B60K 2370/23* (2019.05); *B60K 2370/334* (2019.05); *B60K 2370/347* (2019.05); *B60K 2370/785* (2019.05)

(56) References Cited

FOREIGN PATENT DOCUMENTS

| JP | 11-142972 | 5/1999 |
| JP | 2009-128442 | 6/2009 |
| JP | 2012-112604 | 6/2012 |
| JP | 2017-049570 | 3/2017 |

\* cited by examiner

FIG. 10

MIRROR HOLDING STRUCTURE, MIRROR STRUCTURE, IMAGE DISPLAY SYSTEM AND MOVABLE OBJECT

CROSS-REFERENCE TO RELATED APPLICATION

The present application is a Bypass Continuation of International Application No. PCT/JP2019/013669 filed Mar. 28, 2019, which is based upon and claims the benefit of priority of Japanese Patent Application No. 2018-063266, filed on Mar. 28, 2018, the entire contents of both applications are incorporated herein by reference.

TECHNICAL FIELD

The present disclosure generally relates to mirror holding structures, mirror structures, image display systems, and movable objects. The present disclosure specifically relates to a holding structure including a holder for holding a mirror body, a mirror structure including the holding structure, an image display system including the mirror structure provided in a projection path, and a movable object including the image display system.

BACKGROUND ART

A reflection mirror is disposed in a projection path (see, for example, JP H11-142972 A). Such a mirror is, in general, held by a holder, and the mirror and the holder are fixed with, for example, an adhesive or a two-sided adhesive tape.

For example, however, when the mirror and the holder are fixed with the adhesive, the mirror may deform as the adhesive shrinks when the adhesive is cured, which may lead to distortion of the mirror. Moreover, for example, when the coefficient of thermal expansion differs between the mirror and the holder, the mirror deforms along with thermal expansion and contraction of the holder, which may lead to distortion of the mirror.

SUMMARY

In view of the foregoing, it is an object of the present disclosure to provide a mirror holding structure configured to reduce distortion of a mirror.

A mirror holding structure according to one aspect of the present disclosure includes a holder, at least one protrusion part, at least one reception part, an elastic part, a positioning section, and an expansion tool. The at least one protrusion part is provided to one of a mirror body and the holder. The at least one reception part is provided to the other of the mirror body and the holder. The at least one reception part has an insertion hole in which the at least one protrusion part is to be inserted. The elastic part is located between an outer peripheral surface of the at least one protrusion part and an inner peripheral surface of the insertion hole and is elastic. The positioning section is configured to perform positioning of the at least one elastic part in an insertion direction of the at least one protrusion part into the insertion hole with respect to the at least one protrusion part and the at least one reception part. The positioning section has an expanded part formed by expanding an outer diameter of the at least one elastic part and a contact with which the expanded part comes into contact. The contact is provided on an inner peripheral surface of the insertion hole. The expansion tool is configured to form the expanded part. The expansion tool is configured to push the at least one elastic part by being rotated with a shaft along an insertion direction of the expansion tool as a center to form the expanded part.

A mirror structure according to one aspect of the present disclosure includes the mirror holding structure and the mirror body.

An image display system according to one aspect of the present disclosure include: the mirror structure; an image outputter configured to output an image; and a projection unit configured to display the image output from the image outputter. The mirror structure is configured to reflect and project the image output from the image outputter onto the projection unit.

A movable object according to one aspect of the present disclosure includes the image display system, and a movable object body on which the image display system is mounted.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

[Mirror Holding Structure and Mirror Structure]

Figure 1A:
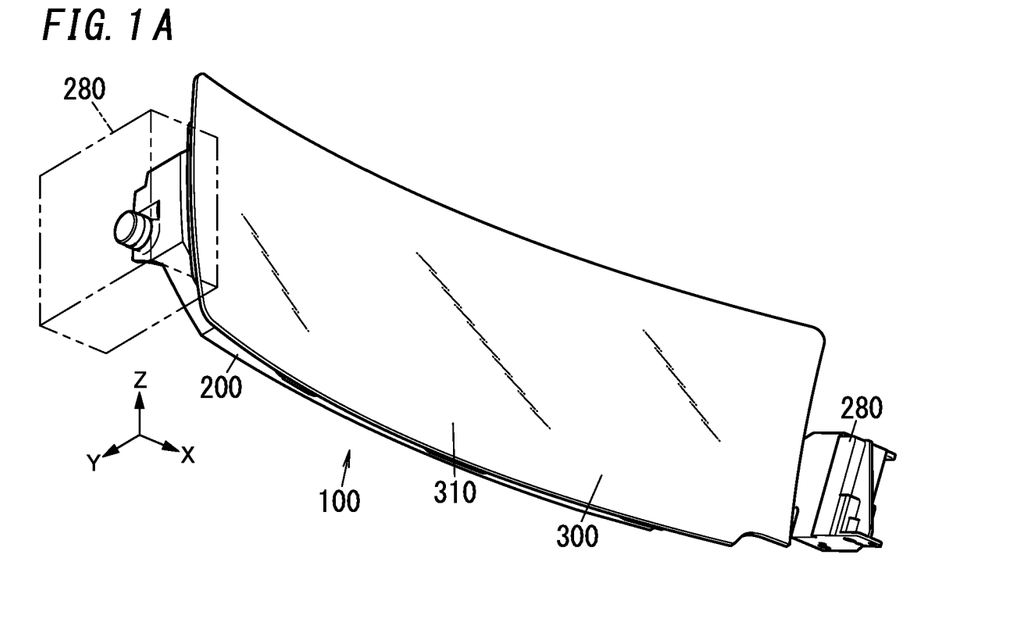
FIG. 1A is a front perspective view illustrating a mirror structure according to one embodiment.
Figure 1B:
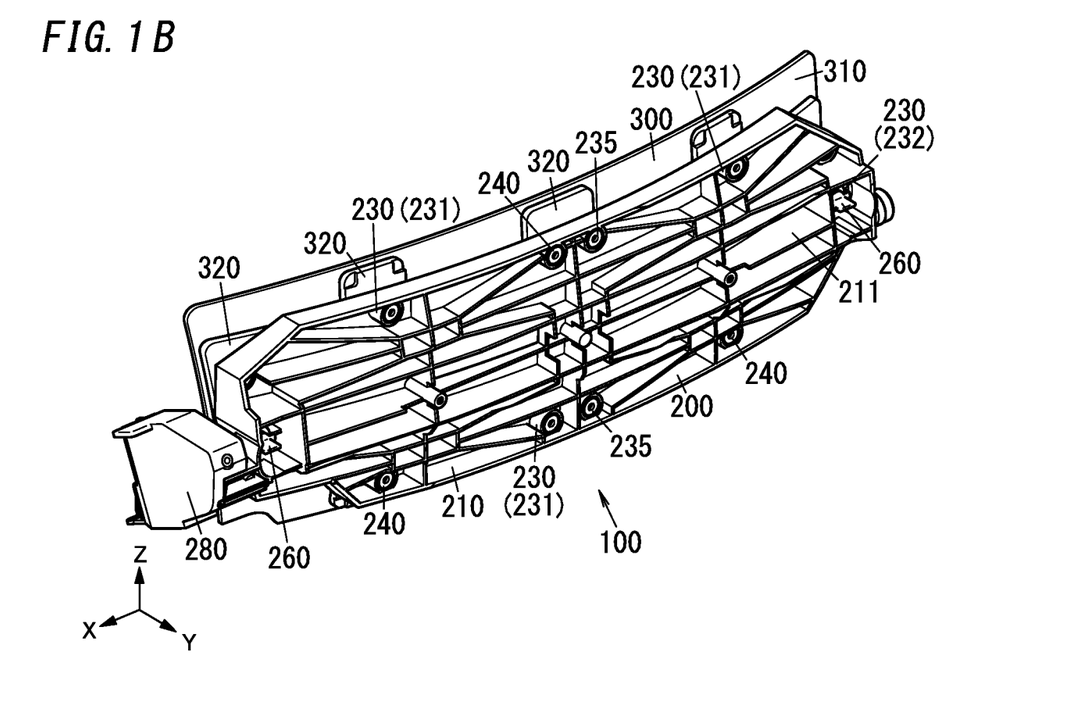
FIG. 1B is a rear perspective view illustrating the mirror structure according to the one embodiment.

FIGS. 1A and 1B shows a mirror structure 100 according to the present embodiment. The present embodiment will be described by reference to the X direction defined as the right/left direction, the Z direction defined as the gravity direction, and the Y direction defined as forward/rearward direction. Note that these directions should not be construed as limiting the directions in which the mirror structure 100 is used.

The mirror structure 100 has a size which allows installation in, for example, a dashboard of an automobile. For example, the dimension of the mirror structure 100 in the X direction is larger than or equal to 30 cm and smaller than or equal to 70 cm.

The mirror structure 100 includes a mirror holding structure 200 and a mirror body 300. That is, the mirror structure 100 includes a combination of the mirror holding structure 200 and the mirror body 300. The mirror holding structure 200 holds the mirror body 300. The mirror holding structure 200 holds the mirror body 300 from a back side of the mirror body 300. The mirror body 300 has a mirror 310 which reflects light.

Figure 2:
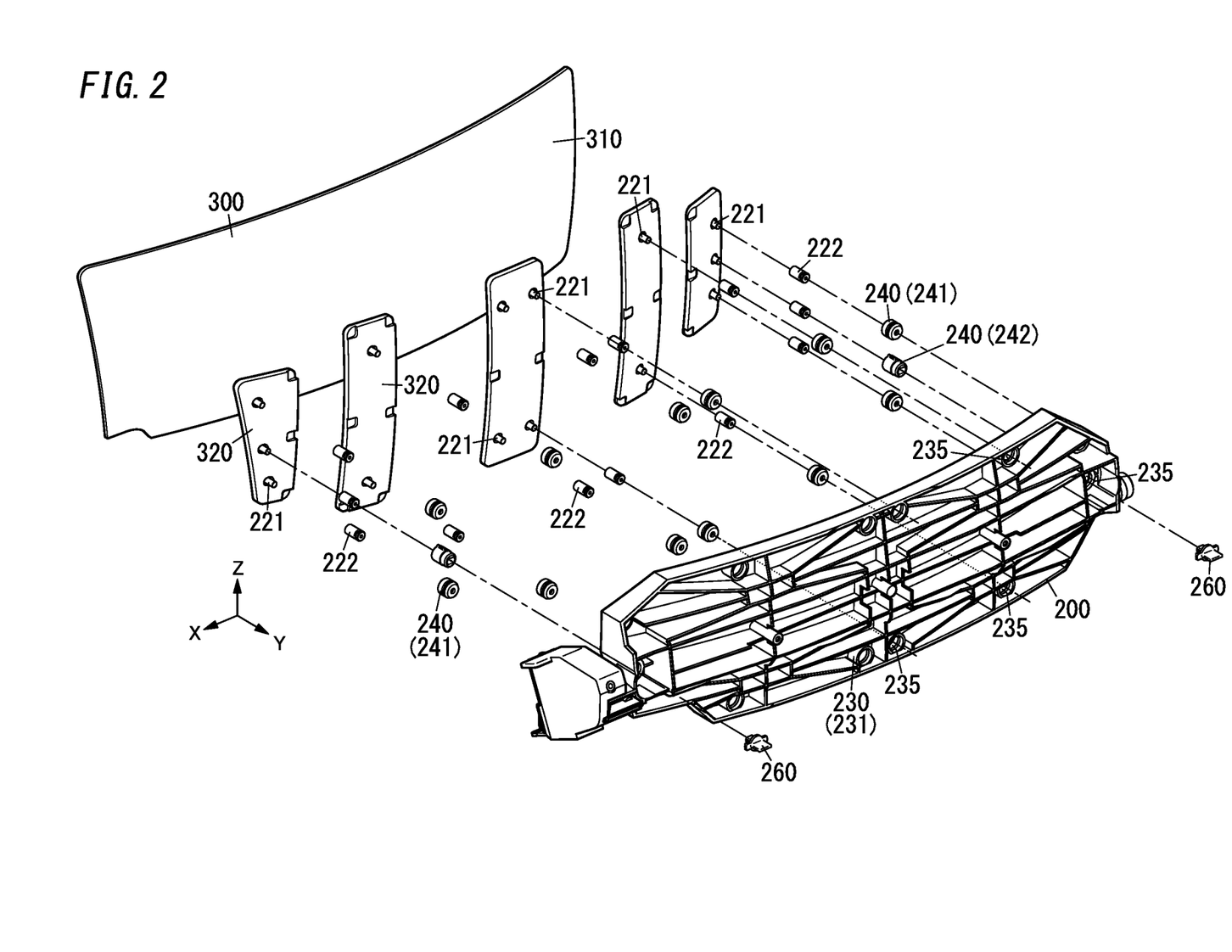
FIG. 2 is an exploded perspective view illustrating the mirror structure according to the one embodiment.

The mirror holding structure 200 includes a holder 210, protrusion parts 220, reception parts 230, and elastic parts 240. That is, the mirror holding structure 200 includes: the holder 210 having the reception parts 230; the protrusion parts 220 held by the reception parts 230; and the elastic parts 240 each located between a corresponding one of the protrusion parts 220 and a corresponding one of the reception parts 230. The mirror body 300 includes the mirror 310 and base parts 320.

Figure 4A:
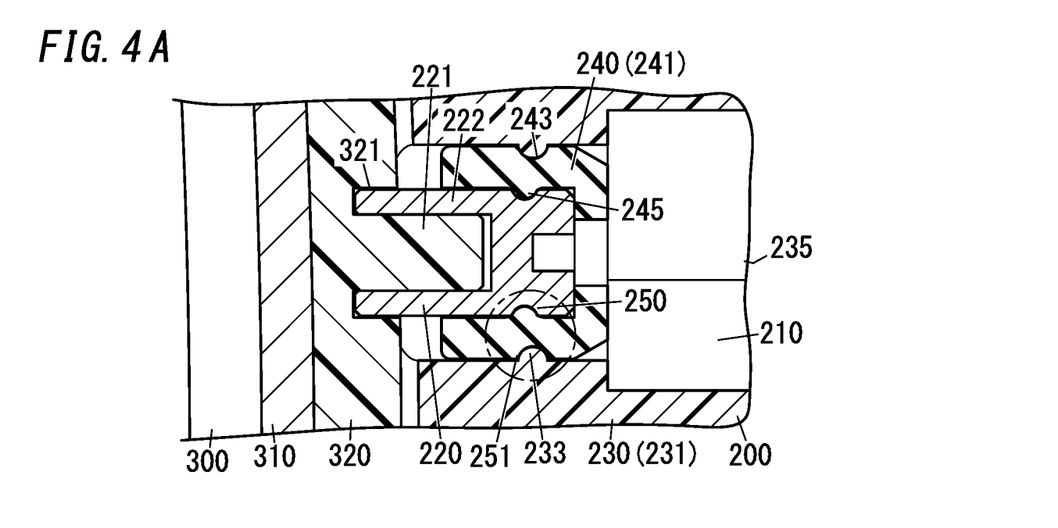
FIG. 4A is an enlarged sectional view illustrating a first reception part of the mirror structure according to the one embodiment.
Figure 5A:
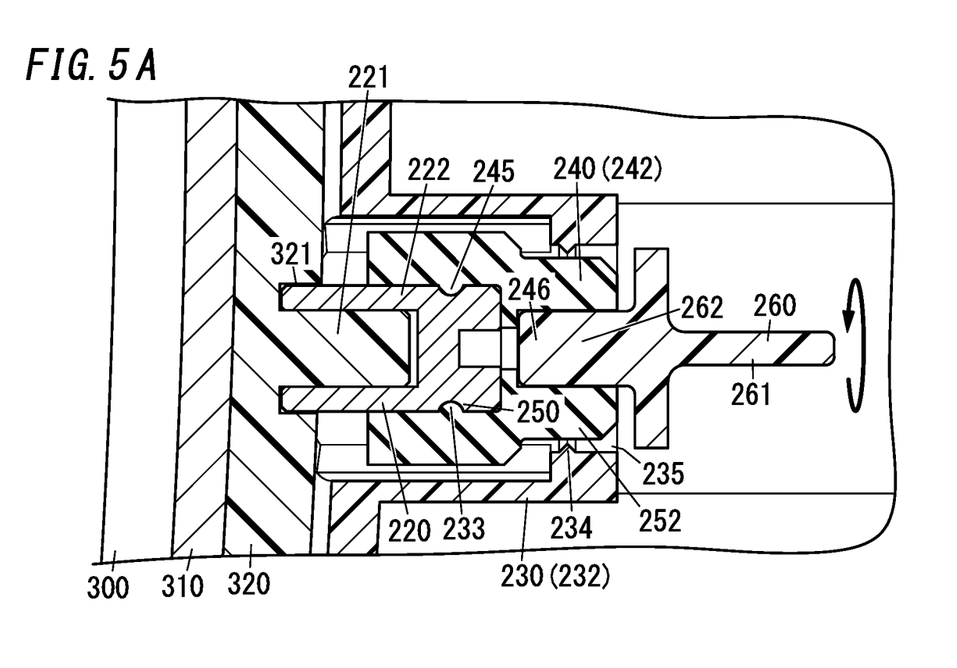
FIG. 5A is an enlarged sectional view illustrating a second reception part of the mirror structure according to the one embodiment.

The holder 210 is a molded product made of a resin. The holder 210 has a plate shape elongated in the X direction and has a rear surface provided with a plurality of ribs 211. The holder 210 has a front surface formed as a concave surface whose both ends in the X direction protrude forward with respect to a central part of the front surface. The holder 210 has a peripheral edge along which the plurality of reception parts 230 are provided. That is, the plurality of reception parts 230 are provided along the peripheral edge of the holder 210. Each reception part 230 protrudes from the rear surface of the holder 210 and has a cylindrical shape. The reception parts 230 have respective insertion holes 235 each having a circular cross section. Each insertion hole 235 penetrates through the holder 210 and a corresponding one of the reception parts 230 in the Y direction. There are two kinds of reception parts 230. As illustrated in FIG. 4A, a first reception part 231 has an inner peripheral surface defining the insertion hole 235, and the inner peripheral surface has a first projection 233 along the full circumference of the insertion hole 235. As illustrated in FIG. 5A, a second reception part 232 has an inner peripheral surface defining the insertion hole 235, and the inner peripheral surface has a contact 234 along the full circumference of the insertion hole 235. The contact 234 protrudes in the insertion hole 235. That is, the contact 234 protrudes in the insertion hole 235.

Figure 3:
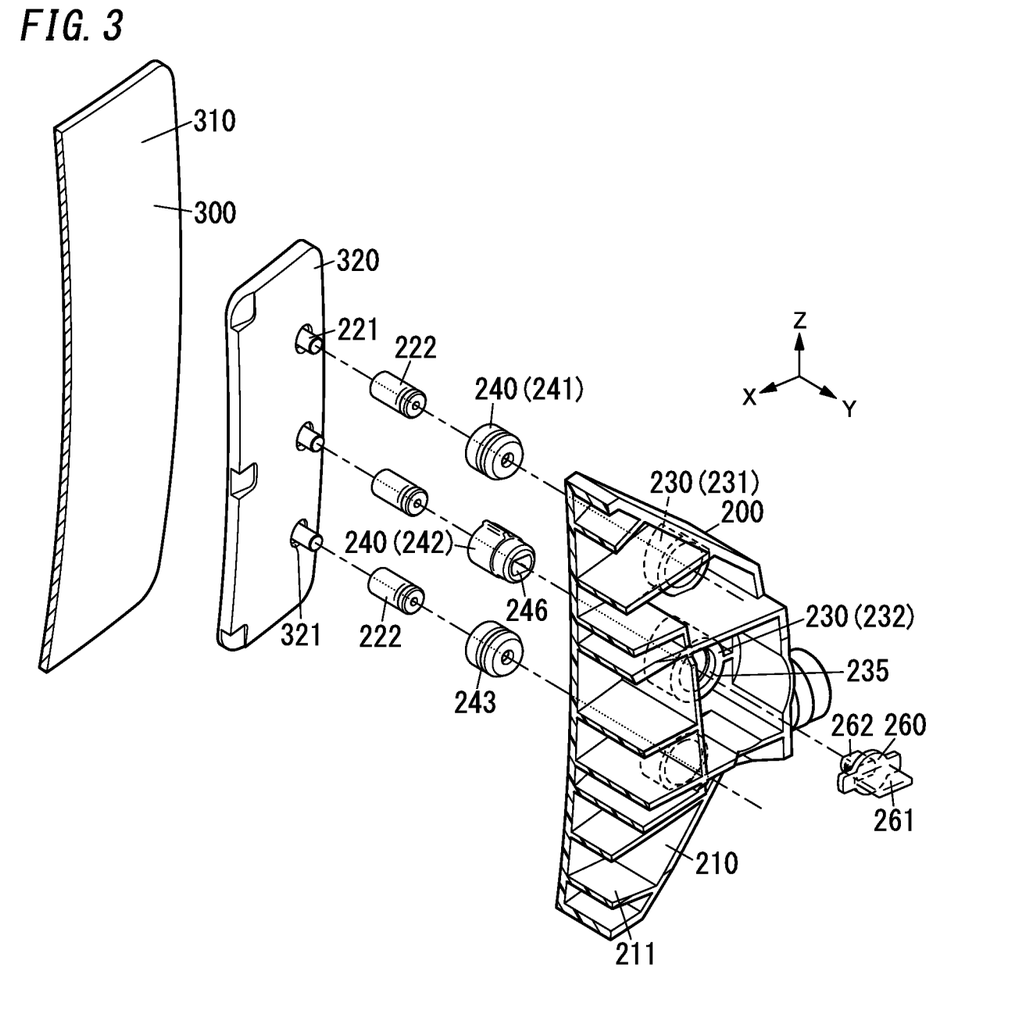
FIG. 3 is an enlarged sectional view illustrating part of the mirror structure according to the one embodiment.

The mirror holding structure 200 includes the plurality of protrusion parts 220. That is, the mirror holding structure 200 has the protrusion parts 220 elongated in the X direction. As illustrated in FIGS. 2 and 3, each protrusion part 220 includes a dowel 221 and a cover material 222. The dowel 221 is made of a resin and has a cylindrical shape. A plurality of dowels 221 are provided on a rear surface of each base part 320. Each dowel 221 has a base in the vicinity of which an attachment recess 321 is provided. The cover material 222 is made of metal and has a cylindrical shape. The cover material 222 has an outer peripheral surface, and a second recess 223 is provided along the full circumference of the outer peripheral surface. The cover material 222 is attached to the dowel 221. The cover material 222 covers an outer side of the dowel 221, and a front end of the cover material 222 is inserted in the attachment recess 321. Each cover material 222 is bonded to a corresponding one of the dowels 221 and an inner surface of a corresponding one of the attachment recesses 321 with an adhesive or the like.

Each elastic part 240 includes an elastic body. As the elastic body, a molded product made of rubber or the like is used. Examples of the rubber include silicone rubber and ethylene propylene diene monomer (EPDM) rubber. Each elastic part 240 has a cylindrical shape. That is, each elastic part 240 has a front surface and a rear surface which are open. Each elastic part 240 has an inner peripheral surface provided with a second projection 245 along the full circumference of the inner peripheral surface. There are two kinds of elastic parts 240. A first elastic part 241 has an outer peripheral surface provided with a first recess 243 along the full circumference of the outer peripheral surface. A second elastic part 242 has an insertion hole 246 rearward of the second projection 245

The mirror 310 is made of glass. The mirror 310 has a plate shape elongated in the Y direction. The mirror 310 has a front surface which is a concave surface whose both ends in the X direction protrude forward with respect to a central part of the front surface. The front surface of the mirror 310 serves as a reflection surface, and light coming from the front is reflected off the front surface. That is, in the present embodiment, the mirror 310 is a concave mirror.

The plurality of base parts 320 are provided on a rear surface of the mirror 310. Each base part 320 is provided with the plurality of dowels 221 and the plurality of attachment recesses 321. Each base part 320 and a corresponding one of the dowels 221 are integrally formed as a resin molded product. The base parts 320 are bonded and arranged on the rear surface of the mirror 310 with an adhesive or the like. Thermal expansion and contraction and vibration which occur at the mirror 310 whose rear surface includes a curved surface may more easily influence the base parts 320 than thermal expansion and contraction and vibration which occur at a mirror whose rear surface is a non-curved surface. This is because a difference of caused stress between locations on the rear surface of the mirror 310 is larger in the case of the curved surface than in the case of the non-curved surface, and accordingly, distortion caused at each location is also larger in the case of the curved surface than in the case of the non-curved surface. Thus, the plurality of base parts 320 arranged on the curved surface are made independent of each other so that each base part 320 is less susceptible to the influence from another base part 320, and thereby, the base parts 320 are made easily follow displacement at each location of the mirror 310. This reduces distortion of the mirror 310, thereby reducing distortion of an image reflected on the mirror 310.

The protrusion parts 220 are inserted into the insertion holes 235, so that the mirror body 300 is held by the holder 210. At this time, the elastic parts 240 are each located between an outer peripheral surface of each protrusion part 220 and the inner peripheral surface of each insertion hole 235. In other words, each elastic part 240 is located on an outer side of the outer peripheral surface of a corresponding one of the protrusion parts 220 and is located on an inner side of the inner peripheral surface of a corresponding one of the insertion holes 235.

Figure 4B:
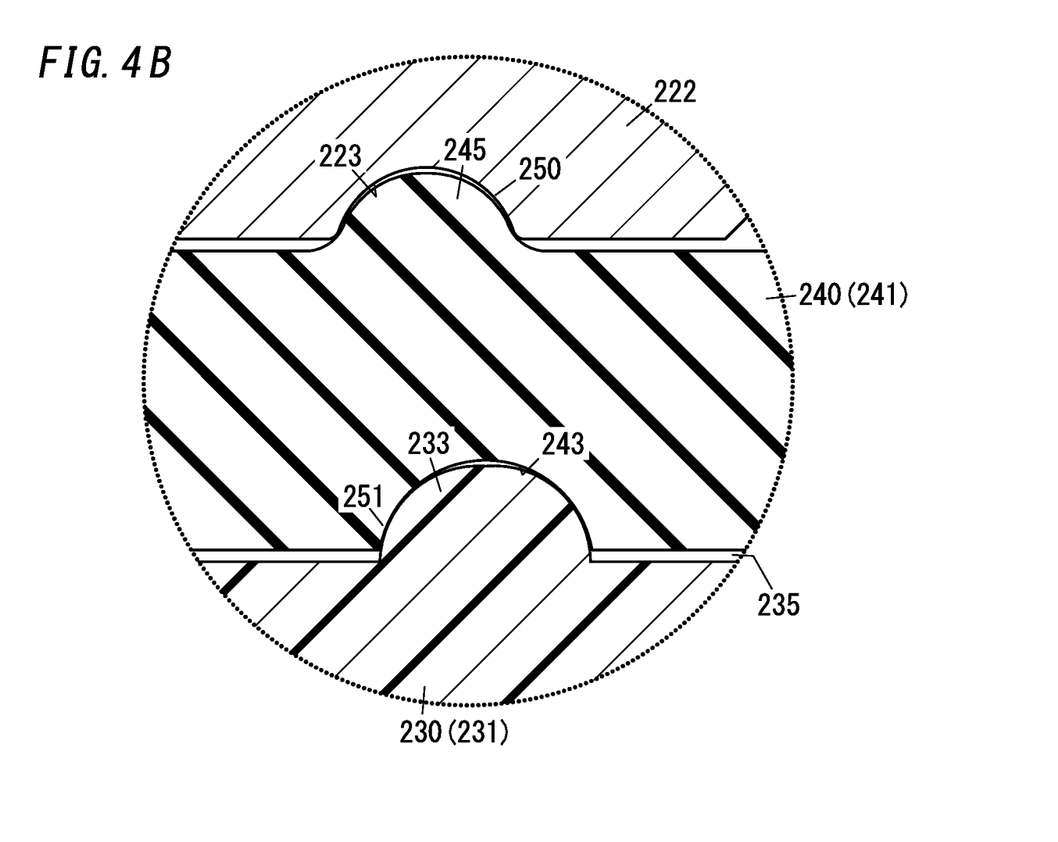
FIG. 4B is an enlarged sectional view illustrating part of FIG. 4A.

Each elastic part 240 is attached on an outer side of the protrusion part 220. In other words, each elastic part 240 is located to surround the protrusion part 220. At this time, as illustrated in FIG. 4B, the second projection 245 of the elastic part 240 is fit in the second recess 223 of the protrusion part 220. In other words, the second projection 245 has an outer peripheral surface located to abut an opening edge of the second recess 223. Thus, a positioning section 250 including the second projection 245 and the second recess 223 performs positioning of the elastic part 240 with respect to the protrusion part 220 in the X direction (insertion direction of the protrusion part 220 into the insertion hole 235). In other words, the elastic part 240 is held by the protrusion part 220 and is not easily moved in the X direction. Here, a curvature radius of the second projection 245 in a cross section orthogonal to the X direction is larger than a curvature radius of the second recess 223 in a cross section orthogonal to the X direction. Therefore, the outer peripheral surface of the second projection 245 abuts the opening edge of the second recess 223. This reduces positional displacement of the second projection 245 and the second recess 223. Thus, shakiness of the mirror body 300 with respect to the holder 210 is easily reduced.

Of the elastic parts 240, the first elastic part 241 includes the protrusion part 220 to be inserted into the first reception part 231, and the second elastic part 242 includes the protrusion part 220 to be inserted into the second reception part 232. The second reception parts 232 are two reception parts 230 provided at both ends of the holder 210 in the X direction, and the other reception parts 230 are the first reception parts 231. Note that all of the reception parts 230 may be the first reception parts 231, or all of the reception parts 230 may be the second reception parts 232.

In the first reception part 231, the first projection 233 is fit in the first recess 243 of the first elastic part 241. That is, part of the first projection 233 is located on an inner side of the first recess 243. Thus, as illustrated in FIG. 4B, a positioning section 251 including the first projection 233 and the first recess 243 performs positioning of the first elastic part 241 and fixes the first elastic part 241 to the first reception part 231 and performs positioning of the holder 210 with respect to the first elastic part 241 in the Y direction (insertion direction of the protrusion part 220 into the insertion hole 235). Here, a curvature radius of the first projection 233 in a cross section orthogonal to the X direction is larger than a curvature radius of the first recess 243 in a cross section orthogonal to the X direction. Therefore, the outer peripheral surface of the first projection 233 abuts an opening edge of the first recess 243. This reduces positional displacement of the first projection 233 and the first recess 243. Thus, shakiness of the mirror body 300 with respect to the holder 210 is easily reduced.

Figure 5B:
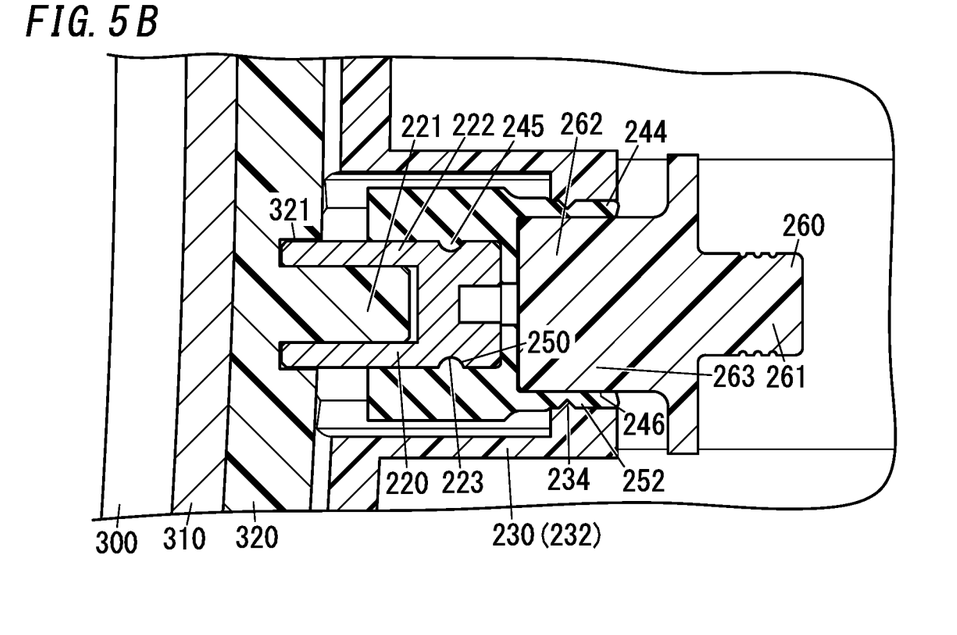
FIG. 5B is an enlarged sectional view illustrating the second reception part of the mirror structure according to the one embodiment.
Figure 6A:
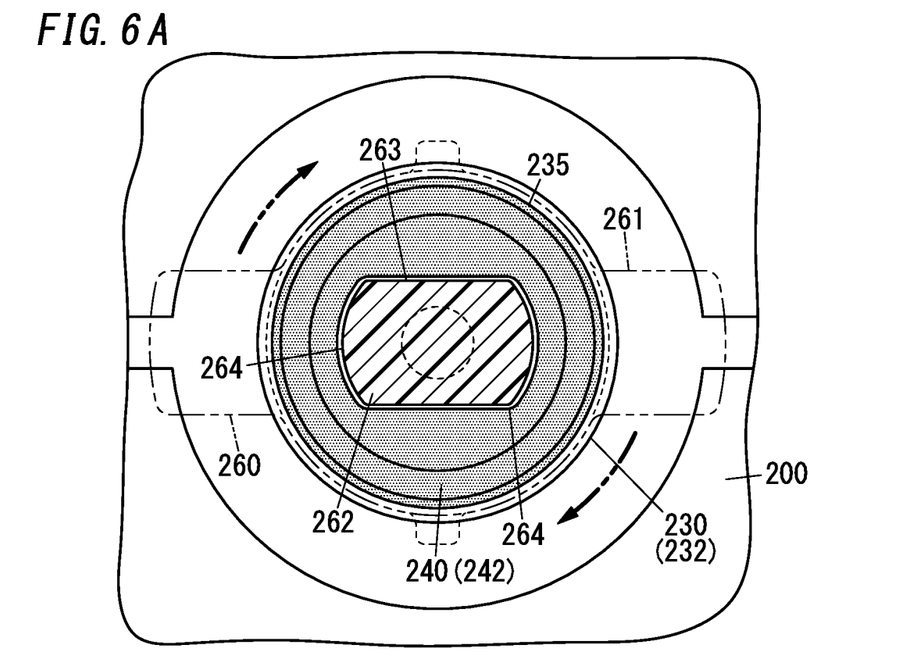
FIG. 6A is an enlarged plan view illustrating the second reception part of the mirror structure according to the one embodiment.
Figure 6B:
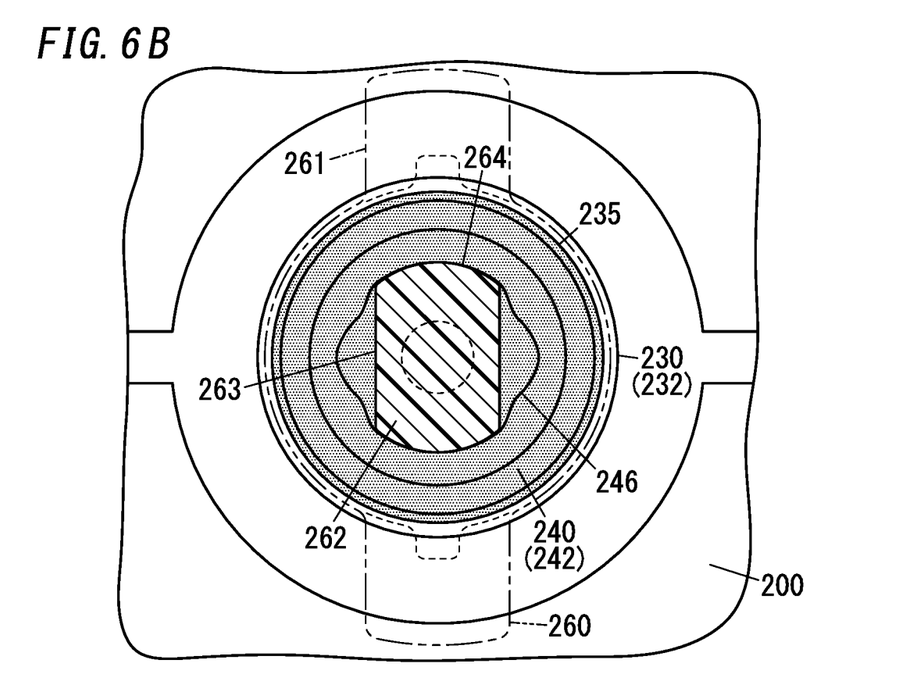
FIG. 6B is an enlarged plan view illustrating the second reception part of the mirror structure according to the one embodiment.

In the second reception part 232, an expansion tool 260 is used. As illustrated in FIGS. 5A and 5B, the expansion tool 260 includes a knob 261 and an expansion part 262. The expansion part 262 has a front face 263 which is larger in dimension than a side face 264 of the expansion part 262. Moreover, the second elastic part 242 has an insertion hole 246 open at a rear surface of the second elastic part 242. The insertion hole 246 is an elongated hole elongated along an X-Z plane. As illustrated in FIGS. 5A and 6A, the expansion part 262 is inserted into the insertion hole 246, and then, the knob is manipulated to rotate the expansion tool 260 with respect to the second elastic part 242 to achieve a state shown in FIGS. 5B and 6B with a shaft along an insertion direction (Y direction) of the protrusion part 220 into the insertion hole 235 as the center. That is, the expansion tool 260 is rotated by about 90° to change the orientation of the expansion tool 260. Thus, the outer diameter of the second elastic part 242 is expanded, and thus, an expanded part 244 is formed, and an outer surface of the expanded part 244 comes into contact with the contact 234. That is, the expanded part 244 is engaged with and is caught by the contact 234. Thus, in the second reception part 232, a positioning section 252 including the contact 234 and the expanded part 244 performs positioning of the second elastic part 242 and fixes the second elastic part 242 to the second reception part 232. the holder 210 is positioned with respect to the second elastic part 242 in the X direction (insertion direction of the protrusion part 220 into the insertion hole 235).

In the second reception part 232, an insertion length of the protrusion part 220 into the insertion hole 235 is adjusted, and then, the second elastic part 242 is positioned with respect to the second reception part 232, and thereby, an arbitrary gap can be set between the mirror 310 and the holder 210, and location adjustment of the mirror 310 can easily be performed.

When the protrusion part 220 is positioned at the second reception part 232, a spacer is preferably provided between the mirror 310 and the holder 210 or between the base part 320 and the holder 210 such that the insertion length of the protrusion part 220 into the insertion hole 235 is not too long.

One end and the other end of the holder 210 in the X direction are provided with respective attachments 280. The holder 210 is supported so as to be rotatable with respect to the attachment 280. Thus, the holder 210 is configured to change its orientation with respect to the attachments 280 mainly in the Z direction. For example, a driving device such as a motor may be accommodated in one of the attachments 280, and the driving device may be driven to change the orientation of the holder 210.

As described above, the mirror body 300 is provided on the front of the holder 210, thereby forming the mirror structure 100.

In the above description, the holder 210 includes the reception part 230, and the mirror body 300 includes the protrusion part 220. However, the holder 210 may include the protrusion part 220, and the mirror body 300 may include the reception part 230.

(Variation of Mirror)

In the above description, the mirror 310 is made of glass, but this should not be construed as limiting. The mirror 310 may be made of a resin.

In the above description, the mirror 310 is a concave mirror, but this should not be construed as limiting. For example, the mirror 310 may be a convex mirror having a convexly curved surface such that both ends in the X direction protrude rearward with respect to the central part of the mirror 310.

(Variation of First Elastic Part)

Figure 7:
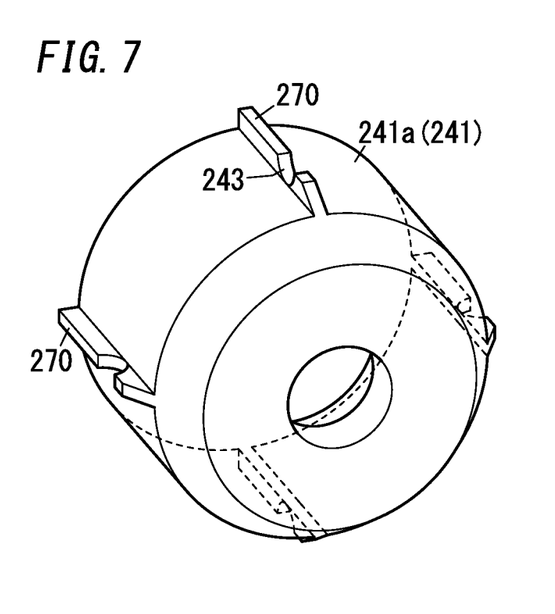
FIG. 7 is a perspective view illustrating a first elastic part of a variation of the mirror structure of the one embodiment.

FIG. 7 shows a variation of a first elastic part 241a. The first elastic part 241a includes a plurality of rib pieces 270. Each rib piece 270 is elongated in a cylindrical shaft direction of the first elastic part 241a. Moreover, each rib piece 270 has a first recess 243 similar to that described above.

(Variation of Expansion Tool)

Figure 8A:
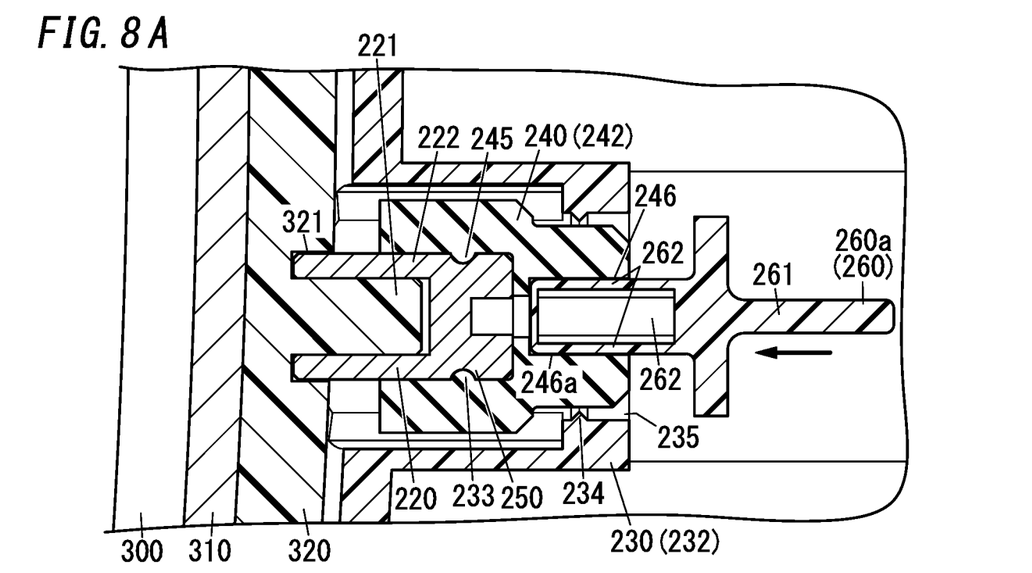
FIG. 8A is an enlarged sectional view illustrating a second reception part of a variation of the mirror structure according to the one embodiment.
Figure 8B:
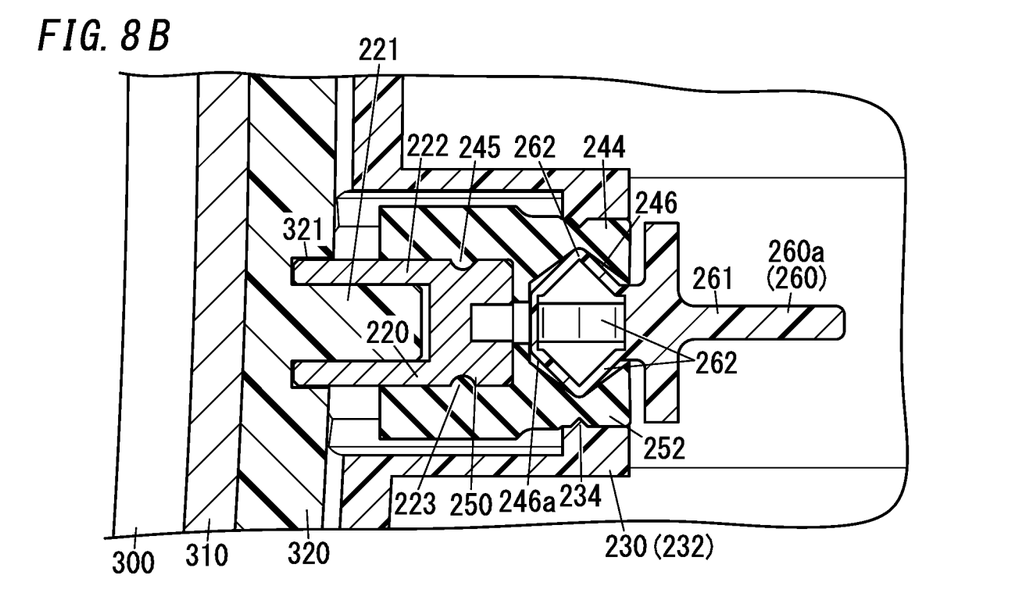
FIG. 8B is an enlarged sectional view illustrating the second reception part of the variation of the mirror structure according to the one embodiment.

FIGS. 8A and 8B show a variation of an expansion tool 260a. As illustrated in FIG. 8A, the expansion tool 260a includes a knob 261 and a plurality of expansion parts 262 each having a plate shape. When a user holds a knob 261 and inserts the expansion parts 262 into the insertion hole 246 along the Y direction, a tip end of each expansion part 262 reaches a bottom part 246a of the insertion hole 246, and when the user further pushes the expansion parts 262 into the insertion hole 246, each expansion part 262 is bent to protrude outward. Thus, bent expansion parts 262 push the second elastic part 242 from an inner side of the insertion hole 246 to expand the outer diameter of the second elastic part 242, thereby forming the expanded part 244, which comes into contact with the contact 234.

Figure 9A:
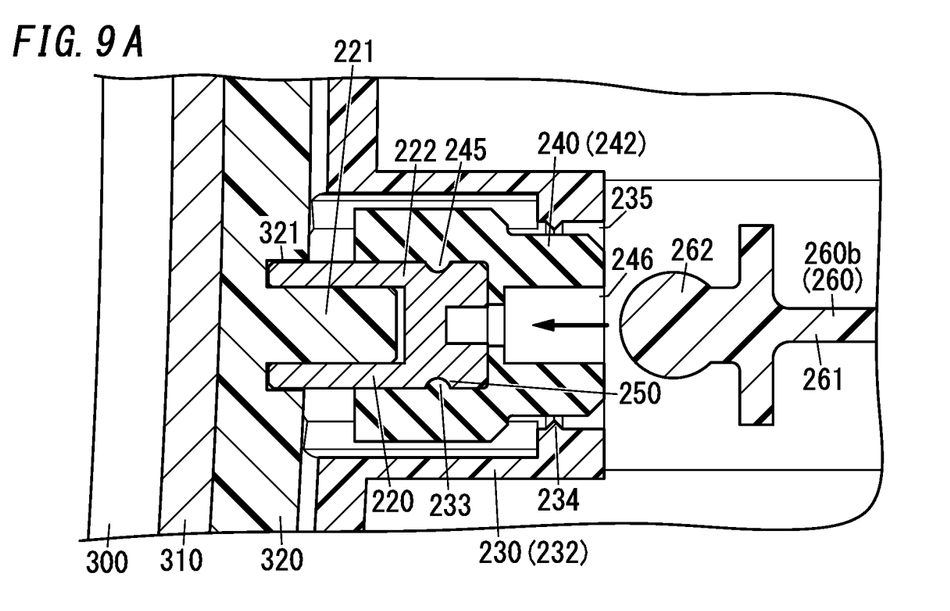
FIG. 9A is an enlarged sectional view illustrating a second reception part of another variation of the mirror structure according to the one embodiment.
Figure 9B:
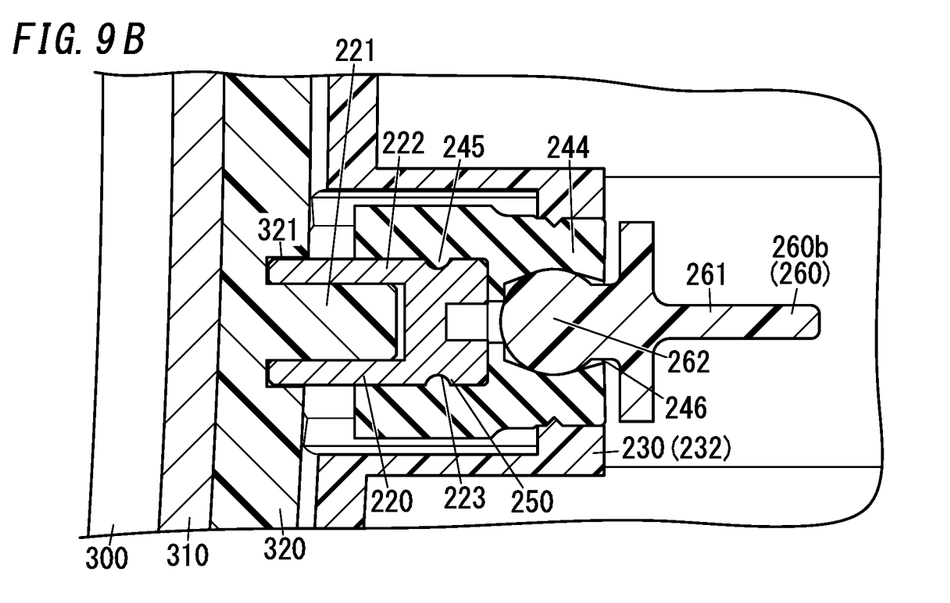
FIG. 9B is an enlarged sectional view illustrating the second reception part of the another variation of the mirror structure according to the one embodiment.

FIGS. 9A and 9B show a variation of an expansion tool 260b. As illustrated in FIG. 9A, the expansion tool 260b includes a knob 261 and an expansion part 262 whose outer diameter is larger than the inner diameter of the insertion hole 246. When a user holds the knob 261 and inserts the expansion part 262 into the insertion hole 246 along the Y direction, the expansion part 262 pushes the second elastic part 242 from an inner side of the insertion hole 246 to expand the outer diameter of the second elastic part 242, thereby forming the expanded part 244, which comes into contact with the contact 234.

[Image Display System and Movable Object]

Figure 10:
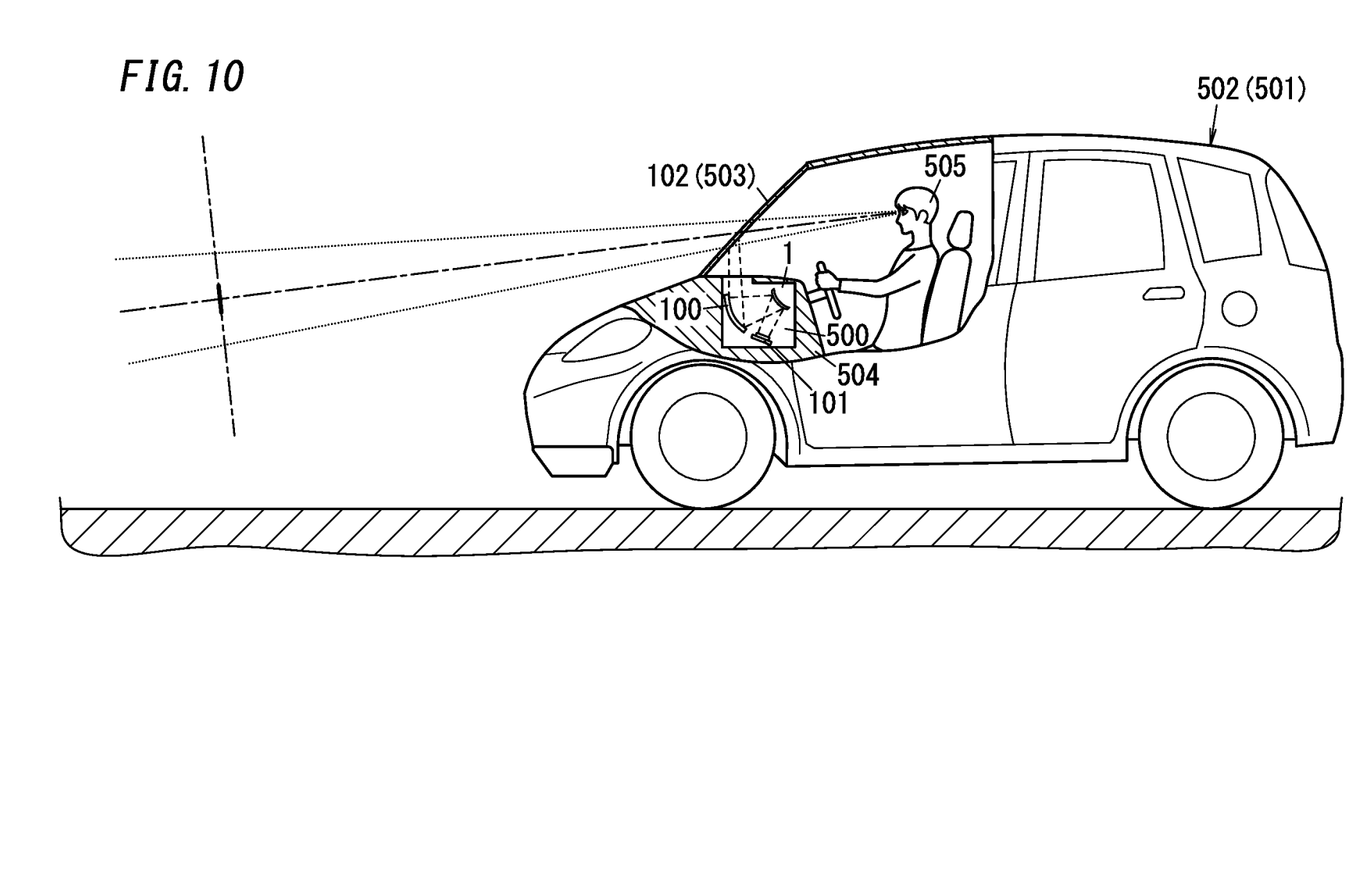
FIG. 10 is a conceptual view illustrating an image display system and a movable object in an embodiment.

An image display system 500 according to the present embodiment includes the mirror structure 100, an image outputter 101 configured to output an image, and a projection unit 102 on which the image output from the image outputter 101 is displayed. The image outputter 101 includes a display surface, forms an image on the display surface, and outputs the image. Onto the projection unit 102, output light of the image outputter 101 projects a virtual image corresponding to the image. Then, the mirror structure 100 reflects the image output from the image outputter 101 to the projection unit 102 and projects the image onto the projection unit 102. That is, the output light of the image outputter 101 is reflected off the mirror 310 of the mirror structure 100, and the image is projected onto the projection unit 102.

The image display system 500 according to the present embodiment is, as illustrated in FIG. 10, for example, a head-up display (HUD) used in an automobile 502 as a movable object body 501.

The image display system 500 is installed in a vehicle interior of the automobile 502 such that an image is projected from below onto a windscreen 503 serving as the projection unit 102 of the automobile 502. For example, the image display system 500 is provided in a dashboard 504 under the windscreen 503. When an image is projected from the image display system 500 onto the windscreen 503, the image reflected off the windscreen 503 as a reflective material is visually perceived by a user 505 (driver).

Examples of the image outputter 101 include a liquid crystal display (LCD) and a light source device. Alternatively, the image outputter 101 may be a device configured to draw an image by a laser beam. The application of the image display system 500 is not limited to the head-up display used in the automobile 502. The image display system 500 is applicable to a movable object body 501, such as a two-wheel vehicle, a train, aircraft, construction machinery, and a marine vessel, other than the automobile 502.

(Variation of Image Display System)

The application of the image display system 500 is not limited to a movable object, but the image display system 500 may be used in, for example, an amusement facility, or may be used as a wearable terminal such as a head mounted display (HMD), a medical facility, or a stationary device. Moreover, the image display system 500 may be used as, for example, an electronic viewfinder by being incorporated into an apparatus such as a projector or a digital camera.

SUMMARY

A mirror holding structure (200) of a first aspect includes: a holder (210); at least one protrusion part (220) provided to one of a mirror body (300) and the holder (210); at least one reception part (230) provided to the other of the mirror body (300) and the holder (210) and having an insertion hole (235) in which the at least one protrusion part (220) is to be inserted; and at least one elastic part (240) located between an outer peripheral surface of the at least one protrusion part (220) and an inner peripheral surface of the insertion hole (235) and being elastic.

According to this structure, the mirror body (300) is held by the holder (210) via the at least one elastic part (240), shrinkage of an adhesive when the adhesive is cured and/or thermal expansion and contraction of the holder (210) are absorbed by the at least one elastic part (240), and the at least one elastic part (240) also absorbs and attenuates vibration. Thus, the shrinkage of the adhesive, the expansion and contraction and the vibration of the holder (210) are less likely to be transmitted from the holder (210) to the mirror body (300). Thus, stress is less likely to be caused at the mirror body (300), thereby reducing distortion.

In a mirror holding structure (200) of a second aspect referring to the first aspect, the at least one protrusion part (220) includes a plurality of protrusion parts, and the at least one reception part (230) includes a plurality of reception parts.

According to this structure, the shrinkage of the adhesive, the expansion and contraction and the vibration of the holder (210) are easily dispersedly transmitted from the holder (210) to the mirror body (300), and transmission of the vibration to part of the mirror body (300) is reduced.

In a mirror holding structure (200) of a third aspect referring to the first or second aspect, the at least one elastic part (240) has a cylindrical shape and is attached to the at least one protrusion part (220).

With this configuration, the at least one elastic part (240) is easily attached to the at least one protrusion part (220), and the structure is simplified.

In a mirror holding structure (200) of a fourth aspect referring to any one of the first to third aspect, the at least one protrusion part (220) is provided to the mirror body (300), and the at least one reception part (230) is provided to the holder (210).

This configuration enables the at least one protrusion part (220) to be inserted into the at least one reception part (230) such that the mirror body (300) is held by the holder (210), and the mirror body (300) is easily held by the holder (210).

A mirror holding structure (200) of a fifth aspect referring to any one of the first to fourth aspect further includes a positioning section (250, 251, 252) configured to perform positioning of the at least one elastic part (240) in an insertion direction of the at least one protrusion part (220) into the insertion hole (231) with respect to the at least one protrusion part (220) and the at least one reception part (230).

With this structure, positioning of the holder (210) and the mirror body (300) is easily performed by the positioning section (250, 251, 252).

In a mirror holding structure (200) of a sixth aspect referring to the fifth aspect, the positioning section (250, 251) has a projection (233, 245) and a recess (223, 243) in which the projection (233, 245) is to be fitted.

With this structure, positioning of the holder (210) and the mirror body (300) is easily performed by fitting the projection (233, 245) in the recess (223, 243).

In a mirror holding structure (200) of a seventh aspect referring to the fifth aspect, the positioning section (252) has an expanded part (244) formed by expanding an outer diameter of the at least one elastic part (240) and a contact (234) with which the expanded part (244) comes into contact, and the contact (234) is provided on an inner peripheral surface of the insertion hole (235).

With this structure, positioning of the holder (210) and the mirror body (300) is easily performed by contact of the expanded part (244) and the contact (234).

A mirror holding structure (200) of an eighth aspect referring to the seventh aspect further includes an expansion tool (260) configured to form the expanded part (244), and the expansion tool (260) is configured to push the at least one elastic part (240) by being rotated with a shaft along an insertion direction of the expansion tool (260) as a center to form the expanded part (244).

With this structure, rotation of the expansion tool (260) forms the expanded part (244), and without pushing the holder (210) to the mirror body (300), positioning of the holder (210) and the mirror body (300) is performed, and thus, the positioning of the holder (210) and the mirror body (300) is easily performed.

A mirror holding structure (200) of a ninth aspect referring to any one of the first to eighth aspects further includes an attachment (280) to which the holder (210) is to be attached, and the holder (210) is attached to the attachment (280) such that an orientation of the holder (210) is changeable.

With this structure, changing the orientation of the holder (210) with respect to the attachment (280) enables the orientation of the mirror body (300) to be changed and enables a reflection direction of light by the mirror body (300) to be easily changed.

A mirror structure (100) of a tenth aspect includes the mirror holding structure (200) of any one of the first to eighth aspects; and the mirror body (300).

With this structure, thermal expansion and contraction and vibration caused at the mirror holding structure (200) are less likely to be transmitted to the mirror body (300), and thus, the mirror body (300) is less likely to be distorted.

In a mirror structure (100) of an eleventh aspect referring to the tenth aspect, the mirror body (300) includes a mirror (310) and the at least one base part (320) provided between the mirror (310) and the holder (210). The at least one protrusion part (220) is provided to the at least one base part (320).

This structure enables the mirror holding structure (200) to be connected to the mirror (310) via the at least one base part (320), and the mirror holding structure (200) makes the mirror (310) less susceptible to distortion.

In a mirror structure (100) of a twelfth aspect referring to the eleventh aspect, the mirror (310) has a surface facing the holder (210) and including a curved surface.

With this structure, arranging the plurality of base parts (320) along the curved surface of the mirror (310) easily makes each of the plurality of base parts (320) follow distortion caused at the mirror (310), and therefore, the mirror (310) is easily connected to the plurality of base parts (320).

An image display system (500) of a thirteenth aspect includes: the mirror structure (100) of any one of the tenth to twelfth aspects; an image outputter (101) configured to output an image; and a projection unit (102) configured to display the image output from the image outputter (101). The mirror structure (100) is configured to reflect and project the image output from the image outputter (101) onto the projection unit (102).

With this structure, thermal expansion and contraction and vibration caused at the mirror holding structure (200) are less likely to be transmitted to the mirror body (300), and thus, the mirror body (300) is less likely to be distorted. Thus, distortion and/or a blur of an image on the projection unit (102) is reduced.

A movable object of a fourteenth aspect includes: the image display system (500) of the thirteenth aspect; and a movable object body (501) on which the image display system (500) is mounted.

With this structure, vibration caused at the movable object body (501) is less likely to be transmitted to the mirror body (300) of the image display system (500), and the image on the projection unit (102) is less likely to be blurred.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A mirror holding structure, comprising:
   a holder,
   at least one protrusion part provided to one of a mirror body and the holder;
   at least one reception part provided to the other of the mirror body and the holder and having an insertion hole in which the at least one protrusion part is to be inserted;
   at least one elastic part located between an outer peripheral surface of the at least one protrusion part and an inner peripheral surface of the insertion hole and is elastic; and
   a positioning section configured to perform positioning of the at least one elastic part in an insertion direction of the at least one protrusion part into the insertion hole with respect to the at least one protrusion part and the at least one reception part,
   wherein
   the positioning section has an expanded part formed by expanding an outer diameter of the at least one elastic part and a contact with which the expanded part comes into contact, and
   the contact is provided on an inner peripheral surface of the insertion hole,
   the mirror holding structure further comprises an expansion tool configured to form the expanded part, wherein
   the expansion tool is configured to push the at least one elastic part by being rotated with a shaft along an insertion direction of the expansion tool as a center to form the expanded part.

2. The mirror holding structure of claim 1, wherein the at least one protrusion part includes a plurality of protrusion parts, and the at least one reception part includes a plurality of reception parts.

3. The mirror holding structure of claim 1, wherein the at least one elastic part has a cylindrical shape and is attached to the at least one protrusion part.

4. The mirror holding structure of claim 1, wherein the at least one protrusion part is provided to the mirror body, and
   the at least one reception part is provided to the holder.

5. The mirror holding structure of claim 1, further comprising
   an attachment to which the holder is attached, wherein the holder is attached to the attachment such that an orientation of the holder is changeable.

6. The mirror holding structure of claim 2, wherein the at least one elastic part has a cylindrical shape and is attached to the at least one protrusion part.

7. The mirror holding structure of claim 2, wherein
the at least one protrusion part is provided to the mirror body, and
the at least one reception part is provided to the holder.

8. The mirror holding structure of claim 3, wherein
the at least one protrusion part is provided to the mirror body, and
the at least one reception part is provided to the holder.

9. The mirror holding structure of claim 2, further comprising
an attachment to which the holder is attached, wherein
the holder is attached to the attachment such that an orientation of the holder is changeable.

10. The mirror holding structure of claim 3, further comprising
an attachment to which the holder is attached, wherein
the holder is attached to the attachment such that an orientation of the holder is changeable.

11. A mirror structure, comprising:
the mirror holding structure of claim 1; and
the mirror body.

12. The mirror structure of claim 11, wherein
the mirror body includes a mirror and at least one base part provided between the mirror and the holder, and
the at least one protrusion part is provided to the at least one base part.

13. The mirror structure of claim 12, wherein
the mirror has a surface facing the holder and including a curved surface.

14. A mirror structure, comprising:
the mirror holding structure of claim 2; and
the mirror body.

15. The mirror structure of claim 14, wherein
the mirror body includes a mirror and at least one base part provided between the mirror and the holder, and
the at least one protrusion part is provided to the at least one base part.

16. The mirror structure of claim 15, wherein
the mirror has a surface facing the holder and including a curved surface.

17. An image display system, comprising:
the mirror structure of claim 11;
an image outputter configured to output an image; and
a projection unit configured to display the image output from the image outputter,
the mirror structure being configured to reflect and project the image output from the image outputter onto the projection unit.

18. An image display system, comprising:
the mirror structure of claim 14;
an image outputter configured to output an image; and
a projection unit configured to display the image output from the image outputter,
the mirror structure being configured to reflect and project the image output from the image outputter onto the projection unit.

19. A movable object, comprising:
the image display system of claim 17; and
a movable object body on which the image display system is mounted.

20. A movable object, comprising:
the image display system of claim 18; and
a movable object body on which the image display system is mounted.

* * * * *